US008407076B2

(12) United States Patent
Nastacio

(10) Patent No.: US 8,407,076 B2
(45) Date of Patent: Mar. 26, 2013

(54) ACCOMMODATING PREPARATORY WORK FOR ELECTRONICALLY SCHEDULED MEETINGS

(75) Inventor: Denilson Nastacio, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 3247 days.

(21) Appl. No.: 10/845,964

(22) Filed: May 14, 2004

(65) Prior Publication Data

US 2005/0256754 A1    Nov. 17, 2005

(51) Int. Cl.
*G06F 9/46* (2006.01)
(52) U.S. Cl. ........................................ 705/7.19
(58) Field of Classification Search .................. 705/7.19
See application file for complete search history.

(56) References Cited

U.S. PATENT DOCUMENTS

| | | | | |
|---|---|---|---|---|
| 4,831,552 A | 5/1989 | Scully et al. | ................ | 364/518 |
| 4,977,520 A * | 12/1990 | McGaughey et al. | ......... | 715/753 |
| 5,050,077 A * | 9/1991 | Vincent | .............................. | 705/8 |
| 5,129,057 A | 7/1992 | Strope et al. | ................... | 395/161 |
| 5,528,745 A | 6/1996 | King et al. | .................... | 395/161 |
| 5,774,867 A * | 6/1998 | Fitzpatrick et al. | ............... | 705/8 |
| 5,899,979 A * | 5/1999 | Miller et al. | ...................... | 705/9 |
| 6,047,260 A | 4/2000 | Levinson | .......................... | 705/9 |
| 6,101,480 A | 8/2000 | Conmy et al. | .................... | 705/9 |
| 6,466,236 B1 | 10/2002 | Pivowar et al. | ............... | 345/835 |
| 6,615,246 B2 | 9/2003 | Pivowar et al. | ............... | 709/214 |
| 6,781,920 B2 * | 8/2004 | Bates et al. | ....................... | 368/10 |
| 7,209,888 B2 * | 4/2007 | Frid-Nielsen et al. | ............ | 705/8 |
| 7,283,970 B2 * | 10/2007 | Cragun et al. | .................... | 705/8 |
| 7,343,312 B2 * | 3/2008 | Capek et al. | ...................... | 705/8 |
| 7,725,342 B2 * | 5/2010 | Keohane et al. | ............. | 705/7.19 |
| 8,065,171 B2 * | 11/2011 | Nguyen et al. | .................... | 705/5 |
| 2001/0014866 A1 | 8/2001 | Conmy et al. | .................... | 705/9 |
| 2003/0018724 A1 | 1/2003 | Mathewson, II et al. | ..... | 709/206 |
| 2004/0039626 A1 | 2/2004 | Voorhees | .......................... | 705/9 |
| 2004/0064567 A1 | 4/2004 | Doss et al. | .................... | 709/228 |
| 2004/0064585 A1 | 4/2004 | Doss et al. | .................... | 709/246 |
| 2004/0088362 A1 * | 5/2004 | Curbow et al. | ............... | 709/207 |

\* cited by examiner

*Primary Examiner* — Romain Jeanty
(74) *Attorney, Agent, or Firm* — Steven L. Nichols; Van Cott, Bagley, Cornwall & McCarthy P.C.

(57) ABSTRACT

Method, apparatus, and computer program products for scheduling and tracking preparatory work associated with electronic meeting invitations. When a meeting invitation is received and tentatively accepted, the user is prompted to enter the expected duration of the associated work. A floating block of time is created, subject to the constraint that it must be completed before the meeting convenes. If both the meeting and the floating block can be scheduled without irresolvable conflicts, they are added to the calendar, and a to-do associated with the floating block may be added to the to-do list. When an invitation for a second meeting conflicts with a first floating block associated with a first meeting, the first floating block may be rescheduled, within its completion-time constraint, to accommodate the second meeting.

16 Claims, 3 Drawing Sheets

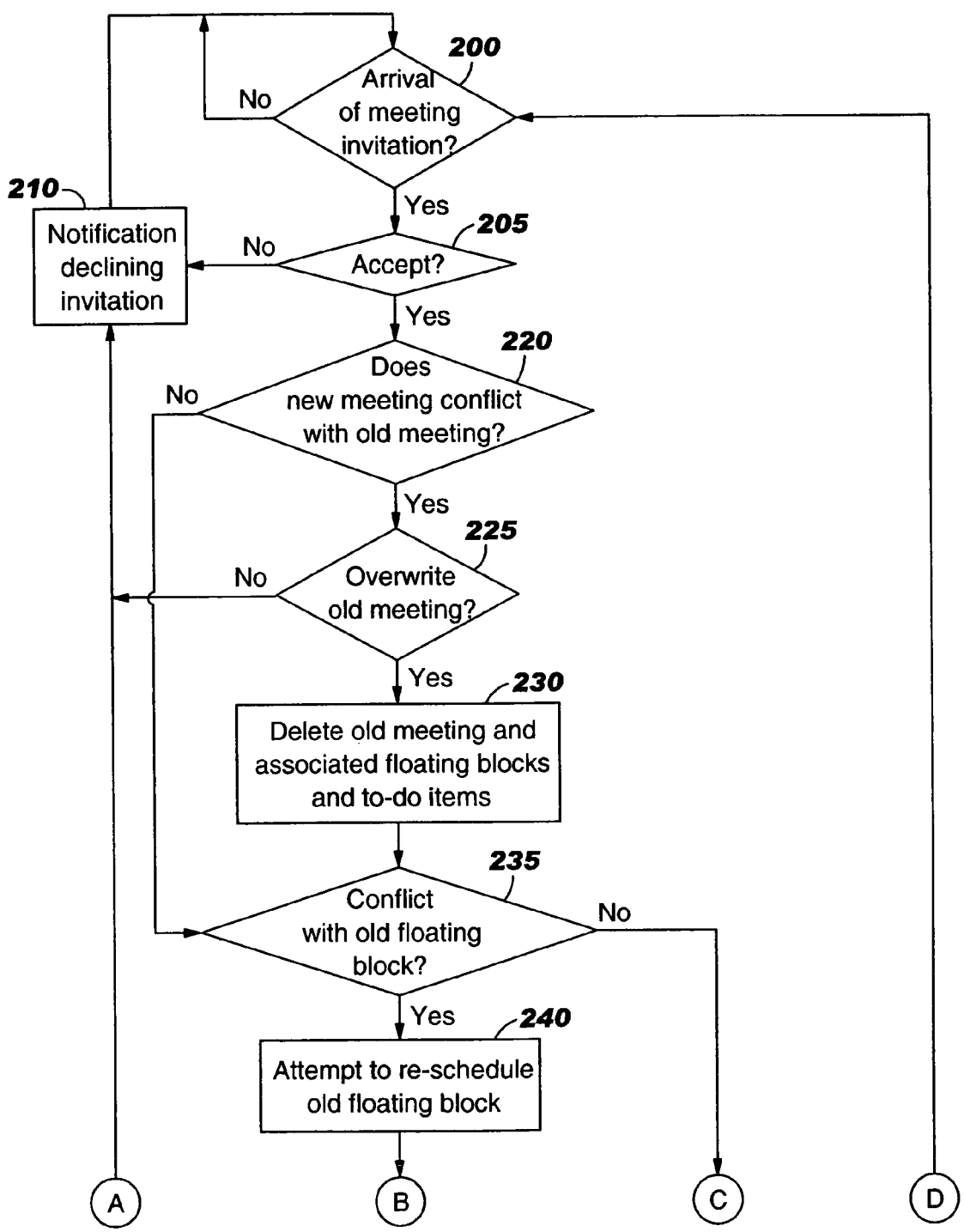

ACCOMMODATING PREPARATORY WORK FOR ELECTRONICALLY SCHEDULED MEETINGS

FIELD OF THE INVENTION

The invention relates to the field of productivity aides such as personal organizers and personal computers that provide electronic calendars and to-do lists.

BACKGROUND

Tracking and organizing a personal schedule has become an important and sometimes intractable problem for professional level workers in modern economies. Tasks in today's workplace arrive in the form of electronic meeting invitations, to-do items, personal appointments, notes from management and colleagues, and so forth. In response, personal organizational tools such as Lotus® Notes® and Microsoft® Outlook have arisen.

Although these tools are quite useful and helpful, they present a number of disjointed views of the workday. For example, such a tool may have an electronic calendar for appointments and meetings, and a to-do list for work items that need to be completed by specified dates. The separateness of these views makes keeping track of overall work commitment problematic.

A problem frequently arises when meetings are scheduled electronically, in that a meeting requires not only its scheduled time, but may also require time for preparatory work that must be completed before the meeting convenes. Such preparatory time is not accounted for by the user's calendar or to-do list when meetings are scheduled electronically.

This omission may result in meetings that have attendees who overbook their days and are therefore unable to prepare adequately, or to overstressed attendees who work long into the night preparing for meetings at the last minute without adequate notice from their personal organizational tools. Thus, there is a need for improved personal organizational tools that track and schedule work commitments that are implicitly or explicitly associated with electronic meeting invitations, but which are not accounted for by today's productivity aids.

SUMMARY

The present invention provides a way of scheduling and tracking preparatory work that is implicitly or explicitly associated with electronic meeting invitations. The associated work often takes the form of to-do items that require blocks of time for their completions before the meetings begin.

According to the invention, a user's calendar and to-do list may be coordinated so as to keep track of associated work that arises from electronically called meetings. When a meeting invitation is received and tentatively accepted, the user is prompted to enter the expected duration of any associated preparatory work. A floating block of time for completing the preparatory work is then created, subject to the constraint that the preparatory work must be completed before the meeting begins. If both the meeting and the associated floating block of time can be scheduled without irresolvable conflicts with other commitments already scheduled, the meeting and the associated floating block of time are added to the user's calendar, and a to-do associated with the floating block is added to the user's to-do list. When an invitation for a second meeting conflicts with a first floating block of time associated with a first meeting, the first floating block may be rescheduled, if possible within its completion-time constraint, to accommodate the second meeting.

BRIEF DESCRIPTION OF THE DRAWINGS

FIGS. 2A and 2B together show an exemplary method for operating the calendar and to-do list of FIG. 1.

DETAILED DESCRIPTION

The present invention includes methods, apparatus, and computer program products for scheduling and tracking preparatory work that is implicitly or explicitly associated with electronic meeting invitations. The associated work often takes the form of to-do items that require blocks of time for their completions before the meetings. According to the invention, a user's calendar and to-do list may be coordinated so as to keep track of such work that arises from electronically called meetings.

Figure 1:
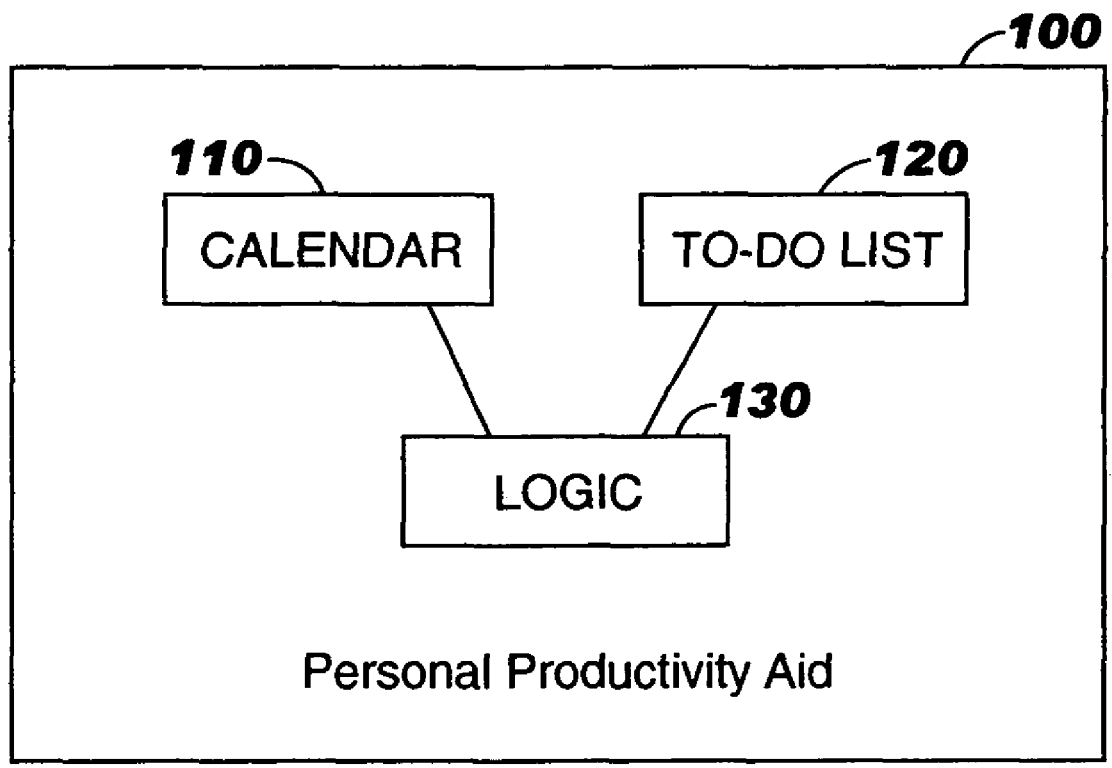
FIG. 1 shows a personal productivity aid having an electronic calendar and a to-do list that operate in concert.

FIG. 1 shows a personal productivity aid 100 having an electronic calendar 110 and to-do list 120 that operate together under the direction of logic 130 according to a method that is explained below with reference to FIG. 2. Here, the electronic calendar 110 and to-do list 120 may be implemented by software, firmware, microcode, and the like for a programmable processor which serves as the logic 130, along with memory. The processor and memory may be part of a personal computer, a hand-held personal organizer, a web server, and so forth.

When an electronic meeting invitation is received and tentatively accepted, the user is prompted to enter the expected duration of any associated work. A floating block of calendar time is then created, with a length equal to the expected duration, subject to the constraint that the block's ending time must occur before the time that the meeting is scheduled to convene. If both the meeting and the associated floating block can be scheduled without irresolvable conflicts, the meeting and the associated floating block of time are added to the user's calendar 110. A to-do item associated with the floating block may be added to the user's to-do list 120. When an invitation for a second meeting conflicts with a first floating block associated with a first meeting, the first floating block may be rescheduled, if possible within its completion-time constraint, to accommodate the second meeting.

Figure 2B:
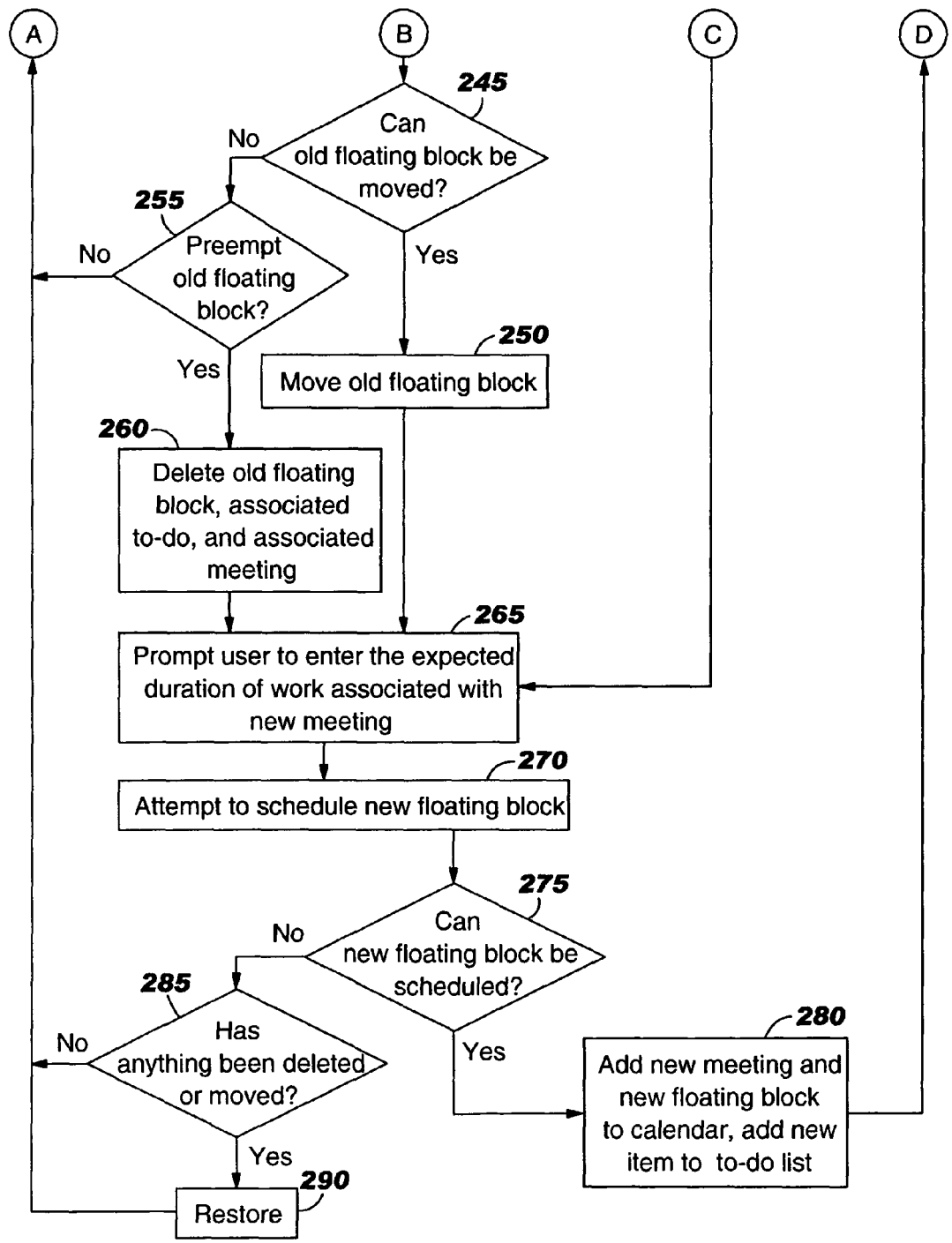

As shown in FIGS. 2A and 2B, the arrival of an incoming electronic meeting invitation is awaited (step 200). Upon the arrival of an invitation, the user is prompted as to whether he or she wishes to accept the invitation tentatively (step 205). If the user does not accept the invitation, i.e., declines, a notification declining the invitation may be sent to the originator of the incoming electronic meeting invitation (step 210). Status then returns to step 200 to await the arrival of the next incoming meeting invitation.

Otherwise (i.e., the user tentatively accepts the invitation), a determination is made as to whether the new meeting conflicts with a meeting already scheduled, which is called here an old meeting (step 220). If the new meeting conflicts with an old meeting, the user is prompted to determine whether he or she would like to overwrite the old meeting with the new meeting on the calendar (step 225). If not, a notification declining the invitation may be sent (step 210), and status returns to await the arrival of another incoming meeting invitation (step 200). If the user would like for the new meeting to overwrite the old, the old meeting and any associated floating blocks of time are deleted from the calendar, and any to-do items associated with the old meeting are deleted from the to-do list (step 230).

Upon completion of step 230, or if the result of step 220 does not indicate a conflict between the new meeting and an old meeting, a determination is made as to whether the new meeting conflicts with any floating block of time already scheduled for another meeting (step 235). If there is a conflict, an attempt is made to free space for the new meeting by rescheduling the floating block that is in conflict with the new meeting, which is now called the old floating block (step 240). In one embodiment of the invention, rescheduling may be done by looking for an open time in the calendar that is consistent with the duration and due-time of the old floating block. The user may impose constraints on the rescheduling of the old floating block. For example, the user may prohibit its movement to times outside predetermined working hours.

Thus, based on the outcome of the scheduling attempt of step 240, a determination is made as to whether or not the old floating block can be moved (step 245). If the old floating block can be moved, the old floating block is moved on the user's calendar, and the to-do list is adjusted accordingly (step 250). If the determination in step 245 is that the old floating block cannot be moved, the user is queried to determine whether he or she would like to preempt the old floating block (step 255). If the user declines to preempt the old floating block, the invitation to the new meeting cannot be accepted, and a notification declining the invitation may be sent (step 210). If the user decides to preempt the old floating block, the old floating block is deleted from the user's calendar, any associated to-do item is deleted from the user's to-do list, and the meeting associated with the old floating block is deleted from the user's calendar (step 260).

After deleting the old floating block in step 260, or moving the old floating block in step 250, or if the determination in step 235 is that the new meeting does not conflict with any of the floating blocks, the user is prompted to enter the expected duration of any preparatory work associated with the new meeting (step 265). A floating block and to-do item are created in association with the new meeting, which are called here the new floating block and the new to-do item. The expected duration is used as the length of the new floating block.

An attempt is then made to schedule the new floating block (step 270). In one embodiment of the invention, scheduling is done by looking for an open time in the calendar that is consistent with the due-time and length of the new floating block. Again, the user may put constraints on the scheduling process, prohibiting, for example, scheduling the new floating block outside normal working hours.

Based on the outcome of the scheduling attempt, a determination is made as to whether the new floating block can be scheduled (step 275). If the new floating block can be scheduled, the new meeting and the new floating block are added to the calendar, and a new to-do item associated with the new floating block is added to the to-do list (step 280). Status then returns to await the arrival of another meeting invitation (step 200). If the new floating block cannot be scheduled, neither the new meeting nor the associated to-do item can be accepted. In this case, a determination is made as to whether an old meeting and associated old floating block or to-do item were deleted in step 230 or step 260, or an old floating block moved in step 250 (step 285). If so, the old meeting, floating block, or to-do item is restored (step 290), and a notification declining the invitation may be sent (step 210). Otherwise (i.e., nothing has been deleted or moved), nothing needs to be restored; a notification declining the invitation may be sent (step 210).

A preferred embodiment of the invention has been described. This embodiment is illustrative of the invention, however, rather than limiting. For example, the use of simple scheduling algorithms have been described with reference to step 240 and step 270. These algorithms have the advantage of simplicity and low complexity, in that they do not move more than one old floating block when attempting to schedule a new floating block. However, the scope of the invention encompasses all scheduling algorithms, not just the simple exemplary algorithms described above. Such algorithms may be, for example, single-capacity bin-packing algorithms that move a plurality of floating blocks in an attempt to schedule efficiently. Numerous examples of such algorithms are known to those skilled in the arts of computer science and operations research.

The invention also encompasses computer program products, including program storage devices readable by a machine, tangibly embodying programs of instructions executable by the machine for implementing the methods or apparatus described above. The program storage device may take the form of any media that can contain, store, communicate, propagate, or transport the program for use by the machine. These media include, for example, computer diskettes, RAM, ROM, CD, EPROM, communication media for downloading instructions, and the like.

Although the foregoing has described methods, apparatus, and computer program products for enhancing personal productivity, the description is illustrative of the invention rather than limiting, and the invention is limited only by the claims that follow.

I claim:

1. A method for accommodating work associated with an electronic meeting invitation, said method comprising, with a computing device:
   receiving an electronic invitation to a meeting;
   associating a floating block of time with the meeting to account for preparatory work for the meeting;
   adding the floating block and the meeting to a user's calendar; and
   determining whether a first meeting conflicts with an existing floating block associated with a different meeting, and, if the first meeting conflicts with an existing floating block associated with a different meeting, changing the existing floating block on the user's calendar.

2. The method of claim 1, further comprising a step of adding a to-do item associated with the meeting to the user's to-do list.

3. The method of claim 1, wherein the step of associating a floating block of time with the meeting comprises steps of prompting the user to enter an expected duration for the preparatory work, and using the expected duration as the length of the floating block of time.

4. The method of claim 1, wherein the step of changing an existing floating block comprises moving the existing floating block comprising rescheduling a plurality of floating blocks using a bin-packing algorithm.

5. The method of claim 1, wherein changing the existing floating block comprises deleting the existing floating block from the user's calendar, any associated to-do items from a to-do list, and the meeting associated with the existing floating block from the user's calendar.

6. The method of claim 1, further comprising:
   attempting to schedule said floating block after changing the existing floating block;

if said floating block cannot be scheduled in sufficient unscheduled time prior to a meeting associated with said floating block, restore original scheduling of the existing floating block and the meeting associated with the existing floating block; and declining an invitation to the first meeting.

7. A program storage device readable by a machine, tangibly embodying a program of instructions executable by the machine to perform method steps for accommodating work associated with an electronic meeting invitation, said method steps comprising:

receiving an electronic invitation to a meeting;

associating a floating block of time with the meeting to account for preparatory work for the meeting; and adding the floating block and the meeting to a user's calendar, wherein associating a floating block of time with the meeting comprises prompting the user to enter an expected duration for the preparatory work and using the expected duration as a length of the floating block of time.

8. The program storage device of claim 7, wherein the method steps further comprise adding a to-do item associated with the meeting to the user's to-do list.

9. The program storage device of claim 7, wherein the method steps further comprise determining whether a new meeting conflicts with an old floating block, and, if the new meeting conflicts with an old floating block, moving the old floating block on the user's calendar.

10. The program storage device of claim 9, wherein the step of moving the old floating block includes a step of rescheduling a plurality of floating blocks using a bin-packing algorithm.

11. The program storage device of claim 7, wherein the method steps further comprise determining whether a first meeting conflicts with an existing floating block associated with a different meeting, and, if the first meeting conflicts with an existing floating block associated with a different meeting, deleting the existing floating block from the user's calendar.

12. Apparatus comprising a computer for accommodating work associated with an electronic meeting invitation, comprising:

a calendar for recording times of meetings; and logic for receiving an electronic invitation to a meeting; associating a floating block of time with the meeting to account for preparatory work; and adding the floating block and the meeting to the calendar, wherein the logic determines whether a new meeting conflicts with an existing floating block, and, if the new meeting conflicts with an existing floating block, determining whether the existing floating block can be moved on the calendar to an unscheduled block of time prior to a meeting associated with the existing floating block.

13. The apparatus of claim 12, further comprising a to-do list, wherein the logic adds a to-do item associated with the meeting to the to-do list.

14. The apparatus of claim 12, wherein the logic prompts the user to enter an expected duration for the preparatory work, and uses the expected duration as the length of the floating block of time.

15. The apparatus of claim 12, wherein the logic moves the existing floating block by rescheduling a plurality of floating blocks using a bin-packing algorithm.

16. The apparatus of claim 12, wherein, if the logic determines that the existing floating block can not be moved, the logic selectively deletes the existing floating block and the meeting associated with the existing floating block from the user's calendar.

\* \* \* \* \*